XR 3,843,960

United States Patent [11] 3,843,960
Kanazawa [45] Oct. 22, 1974

[54] COLOR INFORMATION REPRODUCING SYSTEM

[75] Inventor: Yasunori Kanazawa, Hachioji, Japan

[73] Assignee: Hitachi, Ltd., Tokyo, Japan

[22] Filed: Apr. 27, 1972

[21] Appl. No.: 248,017

[30] Foreign Application Priority Data

Apr. 30, 1971 Japan .............................. 44-27977

[52] U.S. Cl. ............ 358/61, 178/DIG. 18, 350/161
[51] Int. Cl. ........................................... H04n 9/12
[58] Field of Search ....... 178/5.4 R, 7.3 D, DIG. 18; 350/161

[56] References Cited

UNITED STATES PATENTS

| | | | |
|---|---|---|---|
| 3,055,258 | 9/1967 | Hurvitz | 178/DIG. 18 |
| 3,488,437 | 1/1970 | Korpel | 178/DIG. 18 |
| 3,524,011 | 8/1970 | Korpel | 178/5.4 R |
| 3,721,756 | 3/1973 | Baker | 178/5.4 R |

OTHER PUBLICATIONS

IEEE Spectrum, December 1968, Page 42 Only of Article "Laser Display Technology" by C. E. Baker.

*Primary Examiner*—Robert L. Griffin
*Assistant Examiner*—George G. Stellar
*Attorney, Agent, or Firm*—Craig & Antonelli

[57] ABSTRACT

A color information reproducing system comprising a source of white light, an ultrasonic light beam deflector consisting of an ultrasonic medium and an ultrasonic oscillator for performing selective separation and modulation of white light emanating from the light source in response to the application of a color information signal, scanning means for carrying out scanning of the optical signal selectively separated and modulated by the ultrasonic light beam deflector, and display means for displaying the optical signal scanned by the scanning means.

3 Claims, 6 Drawing Figures

COLOR INFORMATION REPRODUCING SYSTEM

BACKGROUND OF THE INVENTION

1. Field of the Invention

This invention relates to a color information reproducing system for optically reproducing color information which is transmitted in the form of an electrical signal.

2. Description of the Prior Art

In a conventional reproducing system of this kind, it is customary that light emanating from a light source is subject to selective separation and brightness modulation depending on color information transmitted to the system thereby obtaining a specific optical signal, and this optical signal is scanned by a scanner to be displayed on a screen so as to reproduce the color information transmitted to the system.

In such a conventional system, the selective separation of light emanating from the light source has been carried out by mechanical means such as a rotary filter, while the brightness modulation of light has been carried out by means such as direct modulation of the quantity of light emanating from the light source, and means such as a rotary polyhedral mirror has been used to constitute the scanner for the optical signal.

However, the conventional system of the kind above described has been defective in that the desired increase in the speed of the selective separation of light is restricted by the limited response speed due to the fact that such operation is carried out by the mechanical means. Further, the direct modulation of the light source for the purpose of the brightness modulation has given rise to another defect in that the service life of the light source is thereby reduced and that it is difficult to obtain the desired characteristics in regard to the dynamic range and linearity of the light source itself.

SUMMARY OF THE INVENTION

With a view to obviate these defects, it is an object of the present invention to provide a novel color information reproducing system in which the selective separation, brightness modulation and scanning are electrically carried out utilizing the ultrasonic light beam deflection effect of an ultrasonic light beam deflector.

Another object of the present invention is to provide a color information reproducing system in which conventional mechanical scanning means may be combined with color information reproducing means according to the present invention so that the conventional mechanical scanning means carries out low-velocity scanning, while the scanning means utilizing the ultrasonic light beam deflection effect according to the present invention carries out high-velocity scanning.

A further object of the present invention is to provide a color information reproducing system which operates with minimized losses of light.

According to the present invention, the following arrangement is employed in order to attain the objects above described. At first, white light emanating from a source of white light is directed to an ultrasonic medium so that it is incident at a predetermined angle of incidence upon the ultrasonic medium whose grating spacing is successively variable depending on a color information signal and whose diffraction efficiency is variable depending on an ultrasonic input signal containing information pertaining to the brightness of the color information signal. Thus, among the wavelength components of white light directed to the ultrasonic medium, the light portion having the wavelength component corresponding to the grating spacing varied depending on the color information signal is solely diffracted at a predetermined diffraction angle, and the brightness of this light portion is modulated by the diffraction efficiency varied depending on the ultrasonic input signal. The optical signal subjected to diffraction and brightness modulation by the ultrasonic medium is then turned by optical means into a light beam collimated to the optical axis of the optical means, and this collimated light beam is directed to light scanning means. The optical signal in the form of the collimated light beam is scanned by the light scanning means to be displayed on display means, and this scanning is carried out in synchronism with the color information signal.

DESCRIPTION OF THE PREFERRED EMBODIMENT

Figure 1:
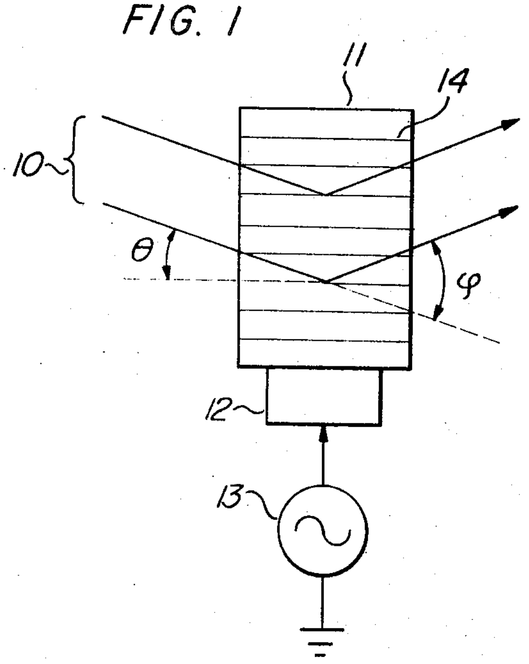
FIG. 1 is a schematic view showing the structure and operation of an ultrasonic light beam deflector preferably used in the present invention.

The ultrasonic light beam deflection effect of an ultrasonic light beam deflector preferably used in the present invention will be described at first with reference to FIG. 1 of the drawing. Referring to FIG. 1, the ultrasonic light beam deflector comprises an ultrasonic light beam deflecting medium 11 (hereinafter referred to merely as a medium) and an ultrasonic oscillator 12 (hereinafter referred to merely as an oscillator) mechanically mounted on the medium 11 at such a position at which a diffraction grating can be effectively formed in the medium 11. The medium 11 may be made of a material such as $LiNbO_3$, $PbMoO_4$ and $H_2O$ which exhibits a high elastooptic effect.

When now the oscillator 12 is energized by a high-frequency oscillator 13, a progressive plane wave (hereinafter referred to merely as a plane wave) is produced by the ultrasonic wave generated by the oscillator 12 and is radiated into the medium 11 thereby forming a diffraction grating 14 in the medium 11. Then, when a beam of white light 10 is projected on the medium 11, the white light 10 is diffracted by the diffraction grating 14 formed in the medium 11, and the light waves including red having a long wavelength are diffracted at a large diffraction angle, while those including blue having a short wavelength are diffracted at a small diffraction angle.

Suppose that $f_s$ is the frequency of the ultrasonic wave and $v$ is the velocity of sound in the medium 11, then the wavelength $\lambda_s$ of the plane wave (ultrasonic wave) is given by the following formula:

$$\lambda_s = (v/f_s)$$

Suppose further that the white light 10 is incident upon the medium 11 at an angle of incidence $\theta$ and is diffracted at a diffraction angle $\phi$. In this case, the diffraction efficiency is highest when the angle of incidence $\theta$ is equal to a specific angle or Bragg's angle $\theta_B$ which satisfies the Bragg's condition. This specific state of diffraction is called the Bragg diffraction.

Suppose further that $\lambda_O$ is the wavelength of the specific light incident upon the medium 11 and $\lambda_s$ is the wavelength of the plane wave when the Bragg diffraction occurs. Then, the following relation holds in view of the Bragg's condition:

$$\sin \theta_B = \tfrac{1}{2} (\lambda_O/\lambda_s)$$

The above formula may be approximated as follows since the Bragg's angle $\theta_B$ is generally very small and $\sin \theta_B \approx \theta_B$:

$$\theta_B \approx \tfrac{1}{2} (\lambda_O/\lambda_s)$$

It is known from the above formula that the Bragg's angle $\theta_B$ is determined by the relation between the wavelength $\lambda_O$ of the specific light incident upon the medium 11 and the wavelength $\lambda_s$ of the plane wave. In other words, the above formula indicates the fact that, when light such as white light including many wavelength components is incident upon the medium 11 at a specific angle of incidence $\theta$, that is, at the Bragg's angle $\theta_B$, a specific component having a wavelength $\lambda_O$ in the incident light, which is determined by the wavelength $\lambda_s$ of the plane wave, can be diffracted with the highest diffraction efficiency.

Further, the diffraction angle $\phi$ is given by $$\phi = 2\, \theta_B$$

and thus, the following formula can be obtained from the formula, $\phi = 2\, \theta_B$, and the formula, $$\theta_B \approx \tfrac{1}{2} (\lambda_O/\lambda_s)$$

which determined the Bragg's angle $\theta_B$:

$$\phi \approx \lambda_O/\lambda_s$$

It is known from this formula that the diffraction angle $\phi$ is determined by the relation between the wavelength $\lambda_O$ of the specific incident light and the wavelength $\lambda_s$ of the plane wave. It is therefore known that the wavelength $\lambda_s$ of the plane wave may merely be varied in order to vary over a wide range the wavelength $\lambda_O$ of the incident light which is diffracted at a predetermined diffraction angle $\phi$. In other words, the light of the desired wavelength $\lambda_O$ can be diffracted at a constant diffraction angle $\phi$ by varying the wavelength $\lambda_s$ of the plane wave progressing through the medium 11, hence the frequency $f_s$ of the ultrasonic wave. Therefore, a light portion having a specific wavelength component can be selectively separated from white light incident upon the medium 11 at a predetermined angle of incidence $\theta_B$. It will thus be seen that selective separation of a desired light portion can be carried out electrically by varying the frequency $f_s$ of the ultrasonic wave.

On the other hand, the brightness of the diffracted light is related with the diffraction efficiency. More precisely, the diffraction efficiency $\eta$ of the medium 11 is given by $$\eta = \tan h^2 (\pi^2/2 \cdot n^6 p^2/\rho v^3 \cdot 1/\lambda_O 2 \cdot W/H \cdot Pa)^{1/2}$$

where $n$ is the index of refraction of the medium 11, $p$ is the elasto-optic constant of the medium 11, $\rho$ is the density of the medium 11, *W and H* are the width and height respectively of the ultrasonic wave column formed within the medium 11, and *Pa* is the power of the ultrasonic wave input applied to the medium 11. Thus, the diffraction efficiency $\eta$ can be varied for varying the brightness of the diffracted light when the power *Pa* of the ultrasonic wave input applied to the medium 11 is varied by modulating the amplitude of the high-frequency input signal energizing the oscillator 12. It will be understood from the above description that the selective separation of light and brightness modulation thereof can be carried out by a single medium 11 by suitably varying the frequency $f_s$ and power *Pa* of the ultrasonic wave.

Further, the ultrasonic light beam deflector having the function above described can also be used for the scanning of light. This is attained due to the fact that the diffraction angle $\phi$ can be varied by varying the wavelength $\lambda_s$ of the plane wave in relation to incident light having a specific wavelength since the diffraction angle $\phi$ is determined by the relation between the wavelength $\lambda_O$ of the incident light and the wavelength $\lambda_s$ of the plane wave.

Figure 2A:
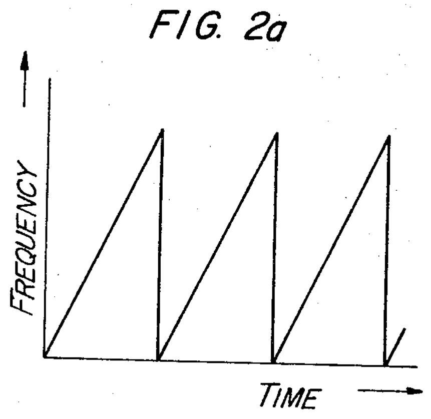
FIGS. 2*a* and 2*b* show waveforms of sweep signals used for the light scanning.
Figure 2B:
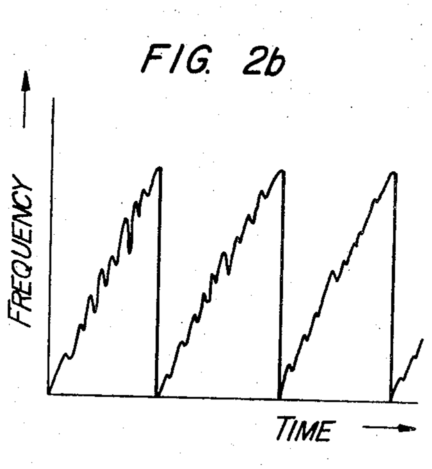

The above fact will be more clearly understood from FIGS. 2*a* and 2*b* showing two forms of a sweep signal preferably used for the scanning of light. Referring to FIG. 2*a*, the frequency, hence the wavelength of the high-frequency input signal applied to the oscillator 12 is varied linearly with time as shown so as to cause a linear variation in the diffraction angle $\phi$ for incident light having a specific wavelength. This principle can be further expanded so as to carry out scanning of incident light having a certain wavelength. Referring to FIG. 2*b*, the frequency, hence the wavelength of the high-frequency input signal applied to the oscillator 12 is varied linearly with time, and at the same time, the wavelength of the plane wave corresponding to the difference between the wavelength of incident light having a certain wavelength and the wavelength of incident light having a specific and constant wavelength is also varied as shown. In other words, the frequency component of the high-frequency input signal corresponding to the difference between the above two wavelengths is also varied as shown so as to cause a linear variation in the diffraction angle $\phi$ for the incident light having the former wavelength.

It will thus be seen that, by varying the high-frequency input signal applied to the oscillator 12 in the manner shown in FIGS. 2*a* and 2*b*, it is possible to linearly vary the diffraction angle $\phi$ of incident light having a specific wavelength and that of incident light having a certain wavelength. Therefore, unidimensional scanning of light can be satisfactorily carried out.

Figure 3:
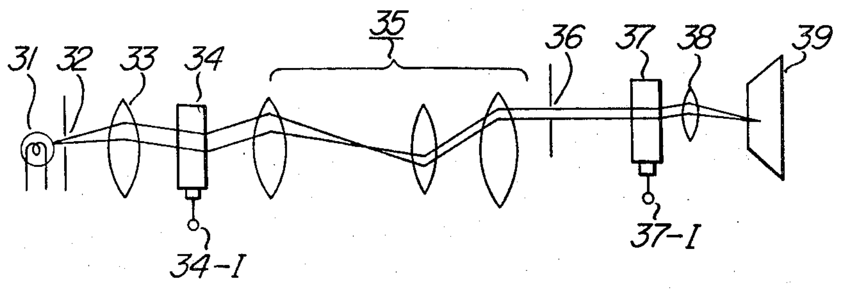
FIG. 3 is a diagrammatic view showing the arrangement of optical means preferably used in a color reproducing system according to the present invention.

FIG. 3 shows the arrangement of one form of optical means preferably used in a color information reproducing system according to the present invention which employs therein an ultrasonic light beam deflector of the kind described in detail hereinabove.

Referring to FIG. 3, the optical means comprises a highly luminant source of white light 31 such as a xenon short-arc lamp, a pinhole 32, a collimator lens 33, an ultrasonic light beam deflector 34 (hereinafter referred to merely as a deflector), a group of lenses 35, a pinhole 36, an ultrasonic light beam scanner 37 (hereinafter referred to merely as a scanner), a condenser lens 38, and a display means 39. In FIG. 3, white light emanating from the source of white light 31 passes through the pinhole 32 and the collimator lens 33 to be turned into a light beam collimated to the optical axis. The collimated light beam emerging from the collimator lens 33 is projected on the deflector 34 which is composed of the medium 11 and the oscillator 12 shown in FIG. 1. The deflector 34 carries out the selective separation of a light portion from the white light and brightness modulation of this light portion as described in detail hereinabove. The deflection angle of the light emerging from the deflector 34 is then increased by the lens group 35 and a light beam collimated to the optical axis of the optical means appears from the lens group 35. The pinhole 36 acts to remove scattered light and zero order diffraction from the collimated light beam so that the desired light beam can only pass through the pinhole 36. This light beam is projected at a predetermined angle of incidence on the scanner 37 which is composed of the medium 11 and the oscillator 12 shown in FIG. 1. In the scanner 37, the medium 11 performs the scanning on the incident light in the manner described with reference to FIG. 2*b* so as to display the information on the display means 39. The optical signal scanned or diffracted by the scanner 37 is condensed by the condenser lens 38 to be focused on the display means 39 which may be a screen. The display means 39 is located in the focal plane of the condenser lens 38.

A preferred structure of means for applying a high-frequency input signal to the deflector 34 and scanner 37 shown in FIG. 3 will be described in detail with reference to FIGS. 4 and 5.

Figure 4:
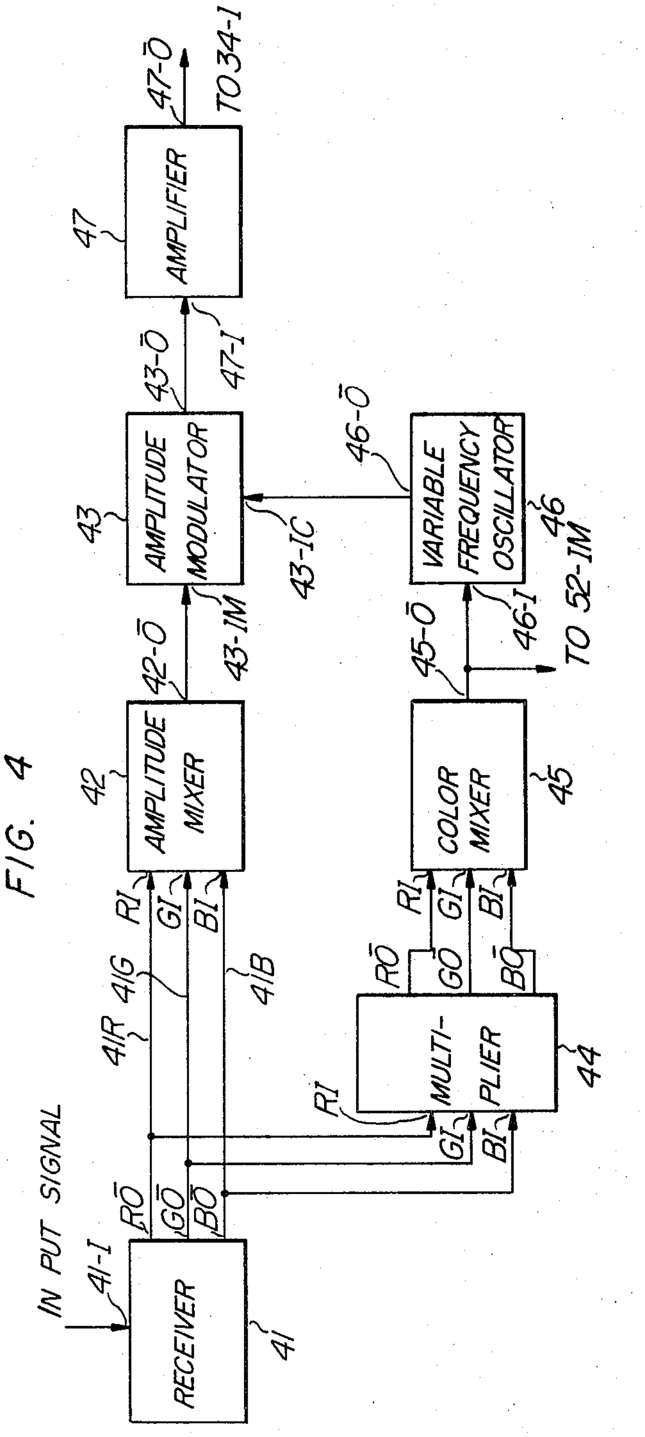
FIG. 4 is a block diagram of a part of the system according to the present invention.

FIG. 4 is a block diagram showing the structure of one form of means for applying a high-frequency input signal to the deflector 34 shown in FIG. 3.

Referring to FIG. 4, a color information signal is transmitted from means such as an image pickup tube (not shown) to be applied to an input terminal 41-I of a receiver 41. In the receiver 41, the color information is broken down into three primary colors of red (R), green (G) and blue(B), and primary color signals 41R, 41G and 41B appear at respective output terminals RŌ, GŌ and BŌ of the receiver 41. The primary chrominance signals 41R, 41G and 41B are applied to respective input terminals RI, GI and BI of an amplitude mixer 42 and are compounded depending on their signal levels thereby producing a brightness signal. This brightness signal appears at an output terminal 42-Ō of the amplitude mixer 42 to be applied to a modulating signal input terminal 43-IM of an amplitude modulator 43.

The primary color signals 41R, 41G and 41B are also applied from the receiver 41 to respective input terminals RI, GI and BI of a multiplier 44 beside the amplitude mixer 42. In the multiplier 44, the primary chrominance signals are suitably weighted and these weighted color signals appear at respective output terminals RŌ, GŌ and BŌ of the multiplier 44. The weighted chrominance signals are applied to respective input terminals RI, GI and BI of a color mixer 45 to be mixed therein. The mixed chrominance signal appears at an output terminal 45-Ō of the color mixer 45 to be applied to a frequency varying input terminal 46-I of a variable frequency oscillator 46.

In response to the application of the chrominance signal from the color mixer 45 to the variable frequency oscillator 46, the oscillator 46 produces a high-frequency signal whose frequency varies successively depending on the chrominance signal, and the high-frequency signal appears at an output terminal 46-Ō of the oscillator 46 to be applied to a carrier input terminal 43-IC of the amplitude modulator 43. In the amplitude modulator 43, the high-frequency signal is subject to amplitude modulation by the brightness signal applied to the modulating signal input terminal 43-IM. The amplitude-modulated signal appears at an output terminal 43-Ō of the amplitude modulator 43 and is applied to an input terminal 47-I of an amplifier 47 to be amplified therein. The amplified amplitude-modulated signal is applied to an input terminal 34-I of the deflector 34 from an output terminal 47-Ō of the amplifier 47.

According to the present invention, the brightness signal is derived on one hand from the color information signal by means of the amplitude mixer 42 and the chrominance signal is derived on the other hand from this same color information signal by means of the multiplier 44 and color mixer 45, so that the brightness signal can be used for varying the diffraction efficiency of the deflector 34, while the chrominance signal can be used for varying the spacing between the gratings. The spacing between the gratings is varied when the oscillation frequency of the variable frequency oscillator 46 is varied by the chrominance signal, because such spacing is determined by the frequency, hence the wavelength of the high-frequency input signal. Further, the diffraction efficiency is varied when the amplitude of the high-frequency input signal is varied by the brightness signal, because such efficiency is determined by the power of the high-frequency input signal.

Figure 5:
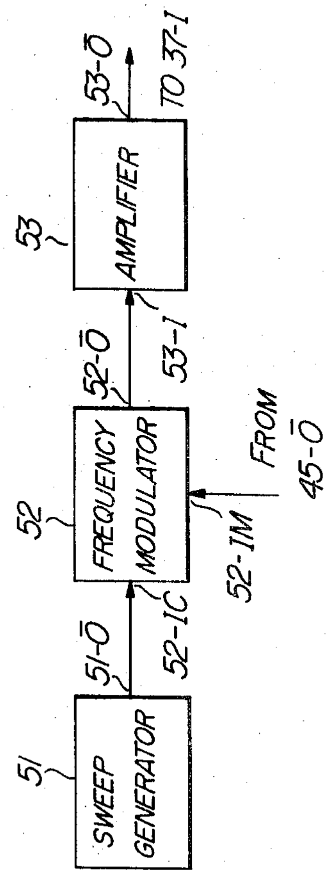
FIG. 5 is a block diagram of another part of the system according to the present invention.

FIG. 5 is a block diagram showing the structure of one form of means for applying a high-frequency input signal to the scanner 37 shown in FIG. 3.

Referring to FIG. 5, a sweep generator 51 generates an output signal whose frequency varies linearly and periodically as shown in FIG. 2*a* and this output signal appears at an output terminal 51-Ō. In this connection, it is to be noted that, in the case of the high-frequency input signal to be applied to the scanner 37, variations in the chrominance information in the color information signal must also be taken into consideration as described already with reference to FIG. 2*b.* Therefore, a frequency modulator 52 is connected to the sweep generator 51 for obtaining a signal having a waveform as shown in FIG. 2b. More precisely, the wavelength of the optical signal entering the scanner 37 varies with real time due to the fact that the color information varies with real time. Therefore, a signal having a waveform as shown in FIG. 2*b* is required for the scanning of the wavelength of the optical signal which varies with real time, and such a signal is produced by the frequency modulator 52. For the purpose of obtaining such a signal, a portion of the chrominance signal is applied from the output terminal 45-Ō of the color mixer 45 shown in FIG. 4 to a modulating signal input terminal 52-IM of the frequency modulator 52. On the other hand, the sweep frequency signal is applied from the output terminal 51-Ō of the sweep generator 51 to a carrier input terminal 52-IC of the frequency modulator 52. In the frequency modulator 52, the sweep frequency signal is subject to frequency modulation by the chrominance signal so that a signal having a waveform as shown in FIG. 2*b* appears at an output terminal 52-Ō. This signal is applied to an input terminal 53-I of an amplifier 53 to be amplified to a predetermined power level. The high-frequency signal amplified by the amplifier 53 is applied from an output terminal 53-O to an input terminal 37-I of the scanner 37 shown in FIG. 3.

While an embodiment of the present invention has been described with reference to an arrangement which is adapted for the unidimensional scanning of an optical signal for the display of information on a display means, for convenience of explanation, it will be apparent to those skilled in the art that two-dimensional scanning can be similarly carried out. In this case, another scanner 37' (not shown) may be merely provided in addition to the scanner 37 shown in FIG. 3 so that it is perpendicular with respect to the scanner 37. The two-dimensional scanning can be easily carried out by arranging in such a manner that the scanner 37 participates in, for example, horizontal scanning and the other scanner 37' participates in vertical scanning. In the case of this two-dimensional scanning, it is to be understood that a lens group as shown by 35 in FIG. 3 should be employed to increase the deflection angle of the light beam diffracted by the scanners 37 and 37'. In the case such as the deflection for the electron beam in a television receiver, the horizontal deflection signal has a high repetition frequency, while the vertical deflection signal has a low repetition frequency. Thus, in the case of the two-dimensional scanning, the horizontal deflection may be carried out by the scanner of the kind used in the present invention, while the vertical deflection may be carried out by a conventional mechanical scanning means such as a rotary polyhedral mirror or galvanometer. The conventional mechanical scanning means of the kind above described is not suitable for horizontal deflection for which a high velocity is required. Thus, the scanner of the kind used in the present invention may be employed for attaining the desired high-velocity scanning, while in the case of, for example, vertical deflection for which such a high velocity is not required, the conventional mechanical scanning means may be employed so as to minimize undesirable losses of light. Further, in the case in which the velocity of scanning need not be so high although it is required to carry out selective separation and modulation of light at a high velocity, for example, in the case in which variations in color information are fast but the scanning may be carried out at a low velocity, conventional mechanical scanning means as above described may be used for the scanning so that the system can operate with little losses of light.

It will be understood further that the means for applying the high-frequency input signal to the deflector 34 and scanner 37 shown in FIG. 3 are not in any way limited to those shown in FIGS. 4 and 5. Any other suitable means may be employed provided that such means is capable of applying to the deflector 34 a high-frequency input signal such that its amplitude and frequency components include a brightness signal component and a chrominance signal component respectively. Similarly, any other suitable means may be employed provided that such means is capable of applying to the scanner 37 a high-frequency input signal such that its frequency component includes a light wavelength component of a color information signal and a frequency component corresponding to the scanning period.

It will be understood from the foregoing detailed description that the present invention provides a color information reproducing system in which means including an electrically energized or controlled ultrasonic light beam deflector are used for selectively separating a specific light portion having a specific wavelength component from white light and subjecting such a specific light portion to brightness modulation. The color information reproducing system according to the present invention provides the following various advantages:

1. The selective separating and modulating means including the ultrasonic light beam deflector are entirely free from undesirable vibrations and wear unlike conventional mechanical means. The ultrasonic light beam deflector has a long service life and can operate with high reliability. Further, it can carry out the selective separation and brightness modulation at a high speed and the maintenance thereof is not troublesome at all. In addition, it can be easily electrically controlled.

2. A white light radiator can be used as the light source. Thus, it can be very simply handled.

3. The scanning means including the ultrasonic light beam deflector can be electrically energized or controlled. Therefore, it can operate with high reliability which could not be obtained with mechanically driven means as above described. Further, high-velocity scanning can be realized.

4. The ultrasonic light beam deflector in the scanning section may be combined with a conventional mechanical light scanning means which is disposed in perpendicular relation to the deflector, so that the color information reproducing system can operate with minimized losses of light.

I claim:

1. A color information reproducing system comprising a light source radiating light including all the wavelength components lying within the visible spectrum range, a first optical means for turning the light emanating from said light source into a light beam collimated to the optical axis, means for producing a color information signal, means for detecting a chrominance signal from said color information signal, means for detecting a brightness signal from said color information signal, means for selectively separating and modulating light disposed in such a position that said collimated light beam is incident thereupon at a predetermined angle of incidence so as to selectively separate solely a light portion having a specific wavelength component from said collimated light beam depending on said chrominance signal and to subject this selectively separated light portion to brightness modulation depending on said brightness signal, a second optical means for detecting the optical signal appearing from said selective separating and modulating means after having been diffracted at a predetermined diffraction angle, scanning means disposed in such a position that said optical signal appearing from said second optical means is incident thereupon at a predetermined angle of incidence so as to carry out scanning of said optical signal, and display means for displaying said scanned optical signal, in which said scanning means comprises an ultrasonic oscillator, an ultrasonic medium arranged for receiving an ultrasonic wave from said ultrasonic oscillator, and signal generating means for generating a sweep signal which is frequency-modulated by said chrominance signal, said optical signal being applied to said ultrasonic medium at a predetermined angle of incidence and said sweep signal being applied to said ultrasonic oscillator for energizing same.

2. A color information reproducing system comprising a source of white light, a convex lens for turning the light emanating from said light source into a light beam collimated to the optical axis, a first ultrasonic medium disposed in such a position that said collimated light beam is incident thereupon at a predetermined angle of incidence, a first ultrasonic oscillator for supplying an ultrasonic wave to said first ultrasonic medium, means for producing a color information signal, means for detecting a chrominance signal from said color information signal, means for detecting a brightness signal from said color information signal, means for generating a high-frequency signal which is amplitude-modulated by said brightness signal and frequency-modulated by said chrominance signal, a plurality of convex lenses for increasing the diffraction angle of the light diffracted by said first ultrasonic medium and turning the light into a light beam collimated to the optical axis, optical means having a pinhole for removing zero order diffraction from said collimated light beam appearing from said convex lenses, a second ultrasonic medium disposed in such a position that the optical signal appearing from said optical means is applied at a predetermined angle of incidence, a second ultrasonic oscillator for supplying an ultrasonic wave to said second ultrasonic medium, signal generating means for generating a sweep signal which is frequency-modulated by said chrominance signal, another convex lens for focusing the light diffracted by said second ultrasonic medium, and display means disposed in the focal plane of said last-mentioned convex lens, said high-frequency signal being applied to said first ultrasonic oscillator for energizing same and said sweep signal being applied to said second ultrasonic oscillator for energizing same.

3. A color information reproducing system comprising a light source radiating light including all the wavelength components lying within the visible spectrum range, a first optical means for turning the light emanating from said light source into a light beam collimated to the optical axis, means for producing a color information signal, means for detecting a chrominance signal from said color information signal, means for detecting a brightness signal from said color information signal, means for carrying out selective separation and modulation of light disposed in such a position that said collimated light beam is incident thereupon at a predetermined angle of incidence so as to selectively separate solely a light portion having a specific wavelength component from said collimated light beam depending on said chrominance signal and to subject this selectively separated light portion to brightness modulation depending on said brightness signal, a second optical means for detecting the optical signal appearing from said selective separating and modulating means after having been diffracted at a predetermined diffraction angle, a first scanning means disposed in such a position that said optical signal appearing from said second optical means is incident thereupon at a predetermined angle of incidence so as to carry out scanning of said optical signal, a second scanning means having an optical axis which crosses at right angles with the optical axis of said first scanning means in a plane perpendicular to the latter optical axis so as to carry out scanning of the optical signal applied from said first scanning means, and display means for displaying the optical signal applied from said second scanning means, in which at least one of said first and second scanning means comprises an ultrasonic oscillator, an ultrasonic medium arranged for receiving an ultrasonic wave from said ultrasonic oscillator, and signal generating means for generating a sweep signal which is frequency-modulated by said chrominance signal, said optical signal being applied to said ultrasonic medium and said sweep signal being applied to said ultrasonic oscillator for energizing same.

* * * * *